Jan. 31, 1967  W. S. ATTWOOD ET AL  3,301,161
MOTOR VEHICLE BODY VENTILATION SYSTEMS
Filed Dec. 4, 1964  4 Sheets-Sheet 1

Inventors
William Spencer Attwood
& David William Tree
BY
Herbert Furman
Attorney 3,301,161
MOTOR VEHICLE BODY VENTILATION SYSTEMS
William Spencer Attwood, Harpenden, and David William Tree, Dunstable, England, assignors to General Motors Corporation, Detroit, Mich., a corporation of Delaware
Filed Dec. 4, 1964, Ser. No. 416,001
Claims priority, application Great Britain, Dec. 20, 1963, 50,322/63
4 Claims. (Cl. 98—2)

This invention relates to motor vehicle body ventilation systems, by which fresh air can be supplied to ventilate the interior of the car body, or to the immediate rear of the windscreen for de-misting purposes.

Systems according to the invention can conveniently be used without a heater to supply cool air, or a heater can be added if desired. Moreover, in such latter case it is found that, by systems according to the invention, a higher temperature can be obtained at the rear of the body than by present systems.

The invention consists in a motor vehicle body ventilation system comprising an air distribution duct arranged transversely of the body in a body compartment forward of the windscreen and communicating centrally with a fresh-air intake, each end of the duct branching into a pair of discharge conduits of which one leads to an outlet opening for windscreen de-misting and the other leads to an outlet opening for body ventilation; and a valve at each end of the duct to apportion the air between the two discharge conduits.

If a heater is required it can be fitted in a central enlarged compartment of the air distribution duct, and in that case two blower units may be fitted one of each side between the heater element and the discharge conduit on that side.

The scope of the invention is defined by the appended claims; how the invention may be performed is particularly described below with reference to the accompanying drawings, in which:

Figure 1:
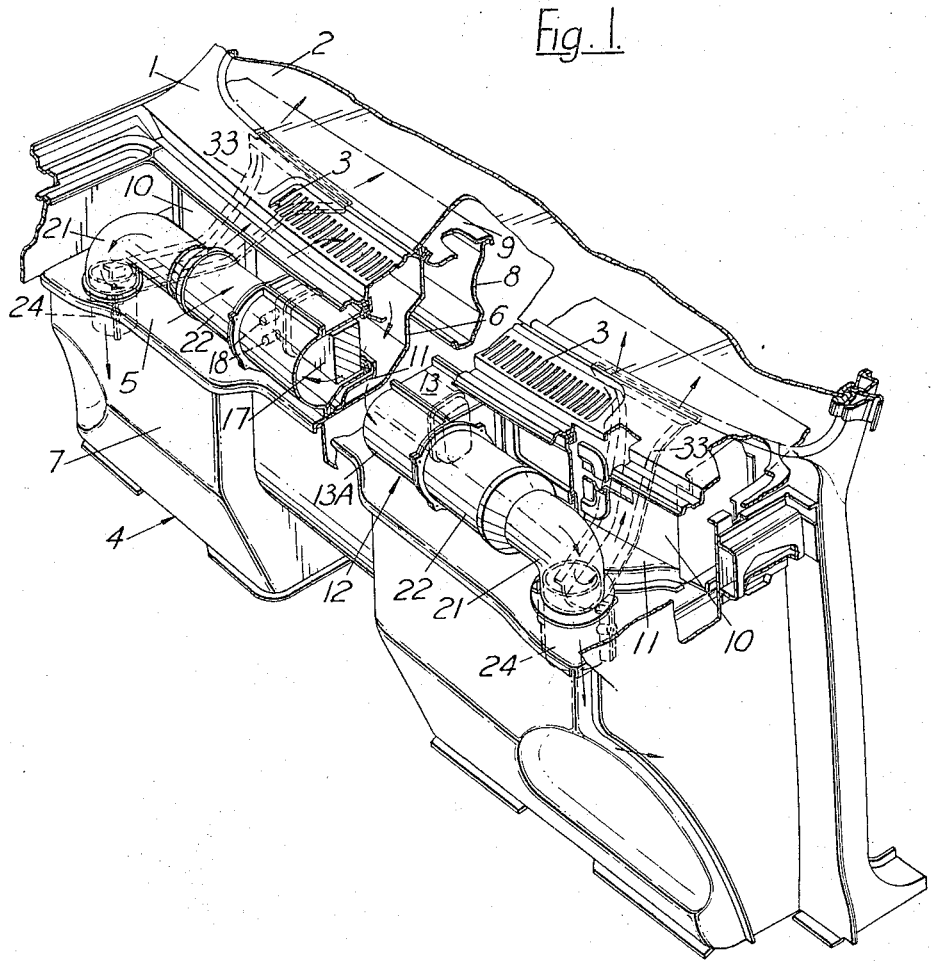
FIGURE 1 is a perspective view, with portions broken away, of part of an automobile body forward of the windscreen, showing the body ventilation system.

The automobile body portion shown in the drawings comprises a hood or scuttle 1 and a windscreen 2. The usual liftable hood cover is omitted. In the hood 1, below the windscreen, there is an intake grille 3 through which fresh air is taken in for the ventilation system. The engine space is divided from the passenger space by a metal partition 4 which includes a horizontal shelf 5, an upward dash portion or panel 6 and a lower part 7. To the rear of the upward dash panel 6 there is affixed an instrument panel comprising an approximately horizontal portion 9 and a downward portion 8. Forward of the panel 6 and separated from it by a space which forms an air intake passage 3A, there is a generally vertical support plate 10, 11 which is joined at the top to the hood 1 and at the bottom to the shelf 5. As shown the upper part 10 of this plate is vertical and the lower part 11 is mainly horizontal except where it is bent downwards towards its attachment to the shelf 5.

Supported by the shelf 5 there is a transversely arranged air distribution duct 12 which comprises a central plenum chamber 13 having a rectangular opening at the rear, the edge 14 of which opening is secured, with a rubber seal 16 between, against the edge 15 of a similar rectangular opening in the plate 10.

The plenum chamber 13 is made up of a curved forward plate 13A, and top and bottom plates which make up a rectangular box-like portion. This box-like portion of the plenum chamber contains a heater element 17 which is pervious to air and is arranged to be supplied with hot water from the engine cooling system by means of inlet and outlet pipes 18.

Figure 2:
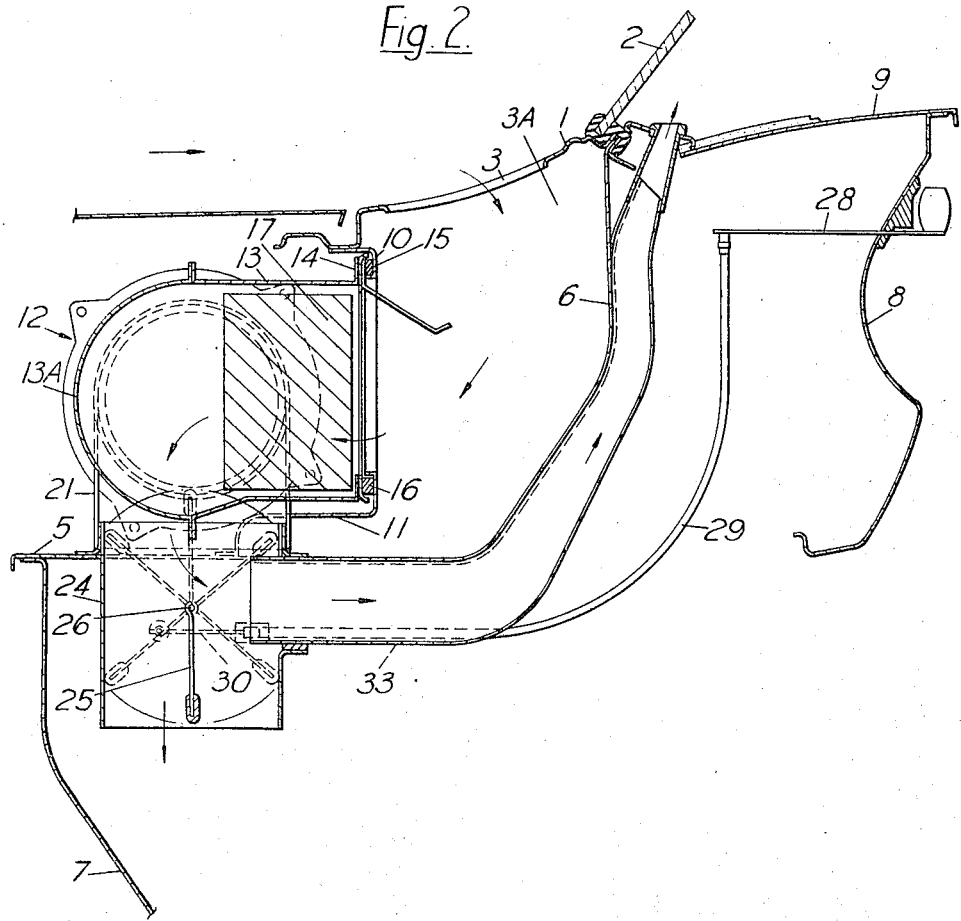
FIGURE 2 is a section of the ventilation system shown in FIGURE 1, the section being taken in the fore-and-aft direction of the vehicle.
Figure 3:
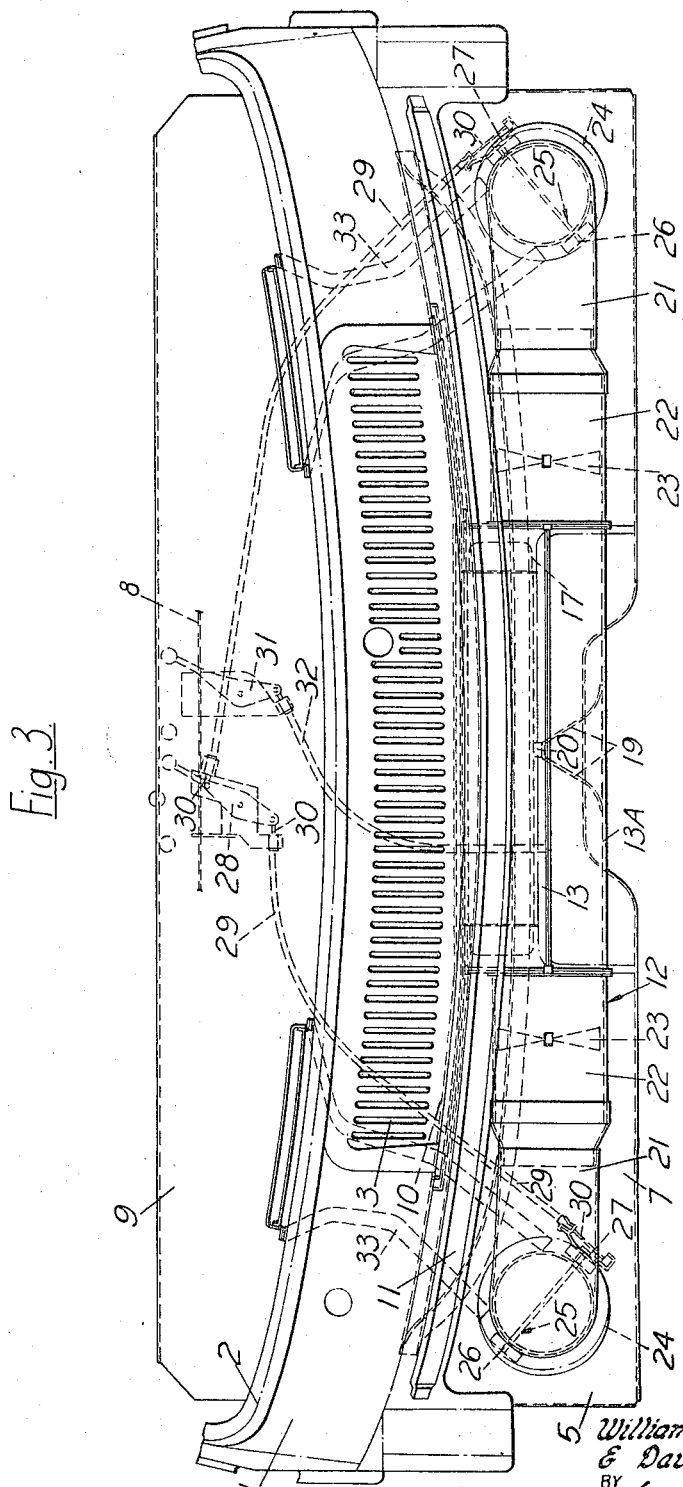
FIGURE 3 is a plan view of the arrangement shown in FIGURE 1.

As shown by the arrows in FIGURE 2, when the vehicle is moving air is taken in through the intake passage 3A and passes through the heater element 17 by which it is heated, when the hot water supply is on. The air, on emerging from the forward side of the heater element 17 into that part of the plenum chamber 13 which is bounded by the curved plate 13A, diverges to the right and left as shown by the arrows in FIGURES 1 and 3, and proceeds in opposite directions outwardly through the air distribution duct 12. In the centre of the plenum chamber 13, the plate 13A, which forms the forward part of this chamber, has fixed to it, as shown in FIGURE 3, an air deflector 19 which assists in the splitting of the air flow to either side. For secure lodgement of the heater element 17 it presses against a pad 20, FIGURE 3, on the inner edge of the air deflector 19.

The air distribution duct 12 is continued outwardly from each side of the plenum chamber 13, by two right-angle-bend duct portions 21. The downwardly bent ends of the duct portions 21 terminate close to the horizontal shelf 5. Each duct portion 21 includes an enlargement 22 forming a blower casing which contains a blower fan indicated diagrammatically at 23 in FIGURE 3. Fixed in, and passing through the shelf 5, at each side of the vehicle, is a valve casing 24 over which fits tightly the bent end of the adjacent duct portion 21, so that the transverse air distribution duct 12 is further continued by the valve casings 24.

Inside each valve casing 24 there is a butterfly valve 25 movable on a pivot 26 by means of a lever 27 which is movable by an operator lever 28 which is pivoted to a mounting on the portion 8 of the instrument panel. As shown in FIGURE 3 the valve operator lever 28 is connected to each of the flexible cables 29, 30 by means of which the butterfly valves 25 can be set to various positions.

Also pivotally mounted on the instrument panel 8 is a heater operator lever 31 connected to a water tap (not shown) on the heater element 17 by a flexible control cable 32. By means of the lever 31 the hot water supply can be turned on or off.

Each of the valve casings 24 branches into a de-mist duct 33 which can conduct air to the base of the windscreen 2 where it is discharged for de-misting purposes. The bottom end of the valve casing 24 and the de-mist duct 33 form a pair of discharge conduits at each end of the air distribution duct 12. Of these conduits, the valve casings 24 form the discharge conduits for body ventilation or heating, and the passages 33 form the discharge conduits for de-mist air.

FIGURE 2 shows three of the possible different positions of the butterfly valve 25. In the position in full lines the delivery of hot air from the heater element is divided between the outlet openings of the valve casings 24, and the de-mist ducts 33. Of the two positions of the valve 25 indicated in broken lines, one position cuts off the delivery of any air, and the other position directs the air solely to the de-mist ducts 33.

Figure 4:
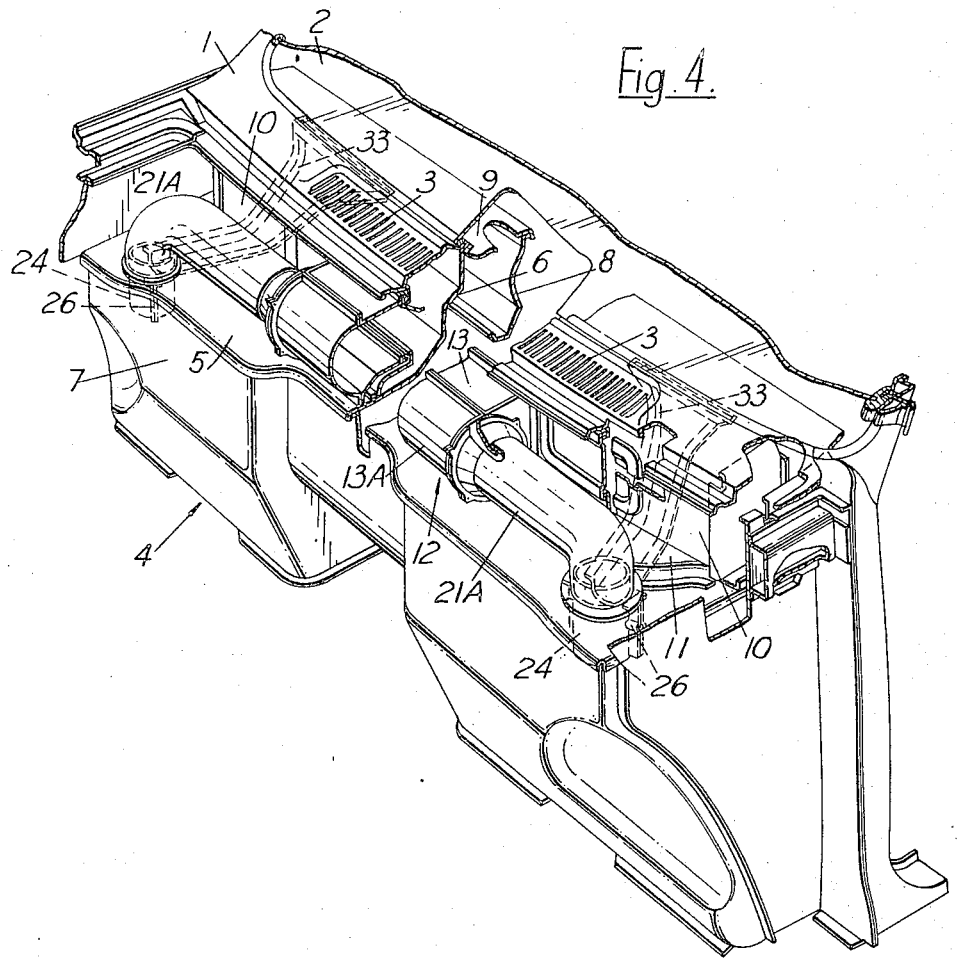
FIGURE 4 is a perspective view similar to FIGURE 1, showing the system of FIGURES 1-3 modified by the omission of a heater element.

The system described above can be modified to serve solely as a ventilation system, using unheated air. The straightforward modifications which are necessary for this purpose are illustrated in FIGURE 4. These modifications involve merely the omission of the heater element 17, and the replacement of the duct portions 21 by similar duct portions 21A which differ in having no blower casing 22 and no blower 23. Fresh air is taken in through the opening 15 in the panel 10, from which it enters the air distribution duct 12 without having been heated and is distributed in opposite directions in the same way as in the embodiment according to FIGURES 1 and 3, including control by the valve 25.

We claim:

1. In combination with a vehicle body having a passenger compartment and a windshield, a ventilation system, comprising, in combination, an air distribution duct extending transversely of the body and including a plenum chamber intermediate the ends of the duct and communicating with an air intake, a heater element located in a first portion of the plenum chamber and discharging air generally longitudinally of the body into a second portion of the plenum chamber, a pair of discharge conduits extending generally transversely of the air flow from the heater element and connected to the second portion of the plenum chamber to receive air therefrom, means diverting the air flow from the second portion of the plenum chamber into each of the conduits, each of the conduits terminating in an outlet communicating with the passenger compartment of the vehicle, a de-mist conduit connected to each of the discharge conduits adjacent the outlet thereof and communicating with the windshield of the vehicle, and valve means in each of the discharge conduits adjacent the outlets thereof to apportion air between the passenger compartment and the windshield.

2. The combination recited in claim 1 including blower means for forcing air through each of the discharge conduits from the second portion of the plenum chamber.

3. The combination recited in claim 2 wherein the discharge conduits are detachably connected to the plenum chamber.

4. The combination recited in claim 1 wherein the body includes a partition separating the passenger compartment from another body compartment, the air distribution duct being located in the body compartment and the discharge conduits having their outlets extending through the partitions and into the passenger compartment, the de-mist conduits being connected to the discharge conduits within the passenger compartment.

References Cited by the Examiner

UNITED STATES PATENTS

| | | | |
|---|---|---|---|
| 2,235,642 | 3/1941 | Lintern | 98—2.4 |
| 2,592,400 | 4/1952 | Edwards | 98—2.4 |
| 2,683,025 | 7/1954 | Matulaitis | 98—2.4 |
| 2,837,288 | 6/1958 | Owen | 98—2.4 |
| 2,984,415 | 5/1961 | Wilfert | 98—2.4 |

MEYER PERLIN, *Primary Examiner.*